Figure 1:
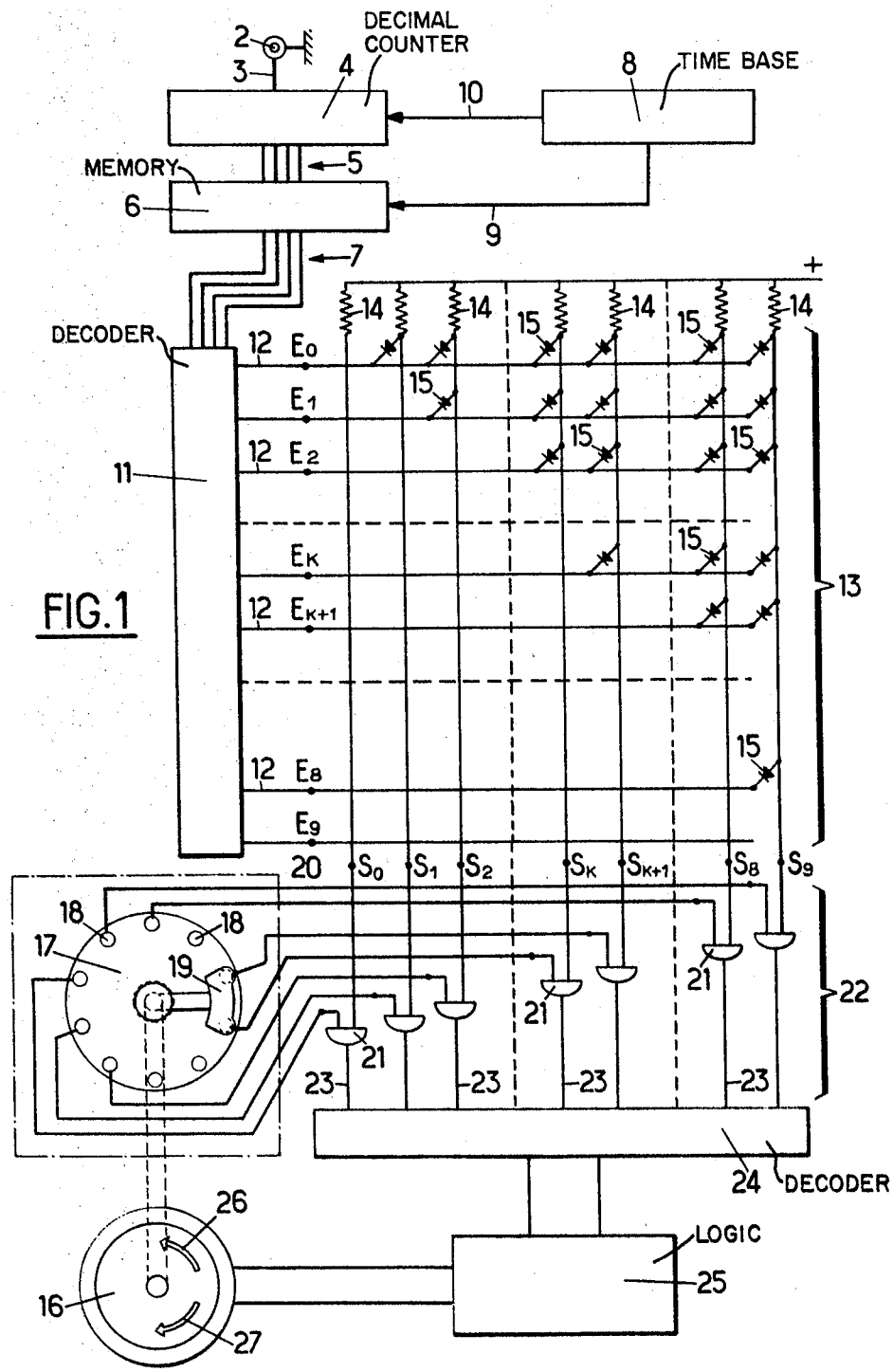

United States Patent

[11] 3,584,201

[72] Inventor Julien Pons
 Rue du Rocher, Adge, (Herault), France
[21] Appl. No. 818,994
[22] Filed Apr. 24, 1969
[45] Patented June 8, 1971

[54] DIGITALLY CONTROLLED PULSE REGISTER
 3 Claims, 2 Drawing Figs.
[52] U.S. Cl. .................................................. 235/92,
 318/601
[51] Int. Cl. .............................................. G06m 3/00
[50] Field of Search .............................................. 235/92, 28,
 66, 54, 324, 543.1, 155; 340/347; 318/20.310,
 20.320

[56] References Cited
UNITED STATES PATENTS

| | | | |
|---|---|---|---|
| 3,090,833 | 5/1963 | Zenner ........................ | 235/155X |
| 3,329,947 | 7/1967 | Larrowe et al. ............... | 340/347 X |

Primary Examiner—Daryl W. Cook
Assistant Examiner—Joseph M. Thesz, Jr.
Attorney—Holcombe, Wetherill and Brisebois ABSTRACT: Means for recording in analog form information which is received in digital form by driving a rotating indicator arm by means of a servomotor controlled by pulses supplied from a digital memory through a decoder and a function mesh.

3,584,201

DIGITALLY CONTROLLED PULSE REGISTER

SUMMARY OF THE INVENTION

This invention relates to the problem of driving the axle of a recording mechanism or indicator at an angular speed dependent on the value of a magnitude which is recorded in digital form in a register. This is particularly necessary when the register is a cyclical counter responsive to periodical or irregular pulses in order that the axle of the mechanism may be dependent on the frequency of these pulses (or their average rate).

This problem has heretofore been solved by transforming the information in a digital to analog converter, after which the control or recording is carried out in analog form. The apparatus is consequently rather complex and not too accurate.

The object of the invention is to effect the control directly in digital form so as to provide a simpler and more accurate mechanism.

The invention consists in connecting the various output terminals of a decade of the register containing the magnitude to a diode-type decoding matrix so that all the output terminals of the network up to a certain rank are in one state and all the output terminals above this rank are in another state, said rank being the expression of the digital value in said decade, and in using a reversible servomotor to drive both the mechanism and a set of rotary switches each corresponding to one decade, and means for causing said switches to operate successively. Each rotary switch comprises a rotary arm carrying two contacts, and a series of contact studs, the number of which is dependent on the numerical system selected, each contact stud being connected to the input of a gate which controls the passage of the voltage of one of the outputs of the matrix. The outputs of these gates are connected to a logic circuit which, for each decade, determines whether a servomotor is stopped, or driven in one direction or driven in the other direction, depending on whether the number of outputs in the different state is equal to one, zero or two, priority being given to information from the decade of higher value when there are several decades.

Figure 2:
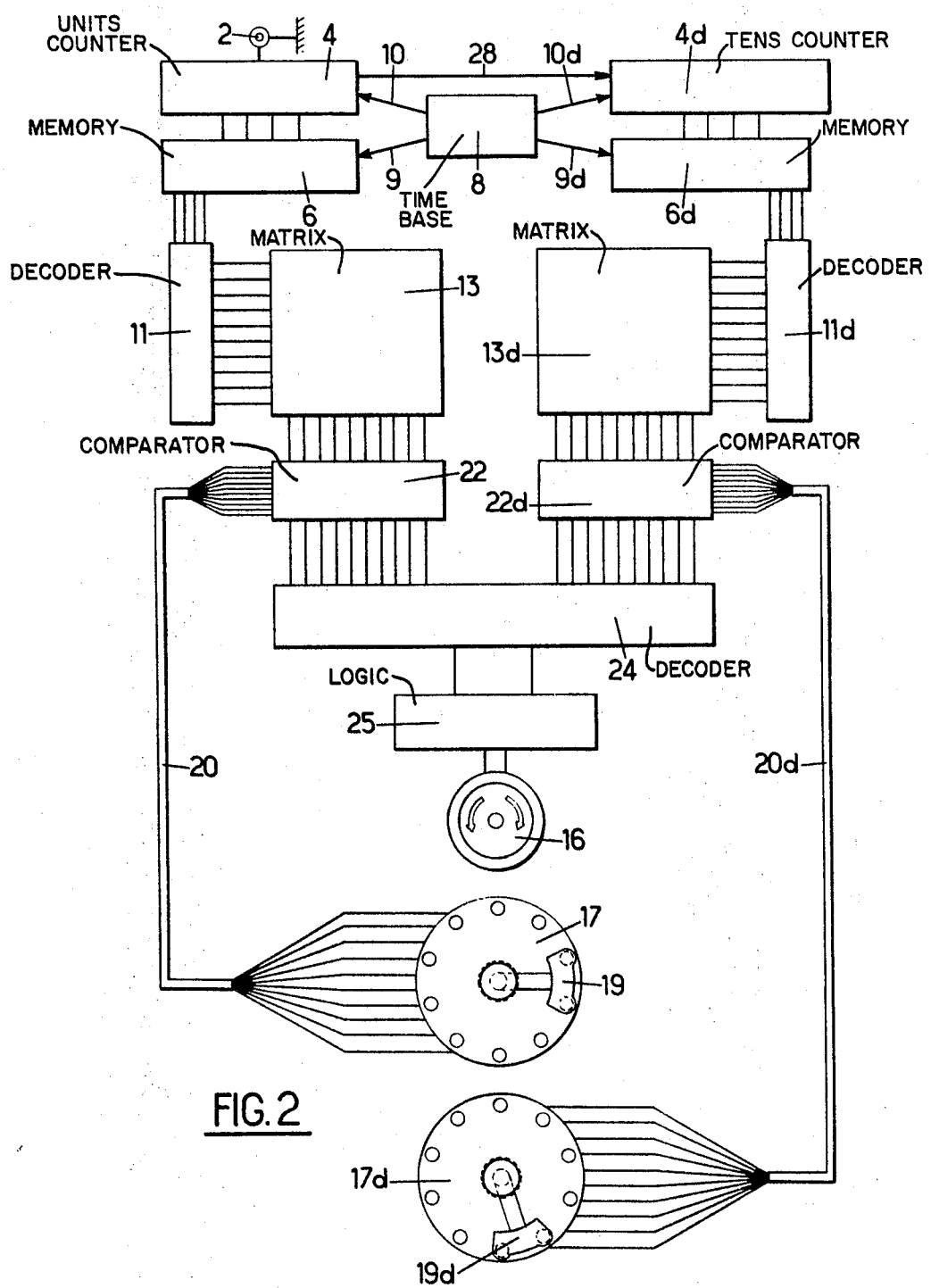

In order that the object of the invention may be better understood, two representative embodiments of the invention will now be described, purely by way of example, with reference to the accompanying drawings, in which:

FIG. 1 is a circuit diagram of a pulse register according to the invention utilizing only one decade; and FIG. 2 is a circuit diagram of a register using two decades.

The device according to the invention may use any numerical system. To simplify the explanation, a binary coded decimal system will be taken as an example, and a positive logic has been arbitrarily selected for this system, that is to say a logic in which the logical state 1 corresponds to a positive voltage or to an open circuit, whereas the logical state 0 corresponds to a zero voltage or grounded circuit.

The gates used are such that if logic states 1 and 1 are applied to their inputs, their output is in the zero state, whereas if states 0 and 1 or 0 and 0 are supplied, the output is in state 1. They are consequently inverting gates.

The apparatus represented on FIG. 1 comprises an input terminal 2 which receives the control pulses. These pulses are transmitted along the line 3 to a decimal counter 4 in the binary mode. This may be of a conventional type consisting of four bistable elements with reset to zero. The decimal number of pulses received is therein translated into a binary code in the form of four voltages transmitted by the conductors 5 to the memory bank 6. This consists of a circuit comprising as many output terminals 7 as input terminals 5 and, when a transfer instruction is received, sets up on the output terminals, the information, that is to say the voltages supplied to its inputs and holds them unchangeable, regardless of any modifications which the voltages at the input terminals 5 may then undergo, until the next transfer pulses are received.

The device also comprises a time base 8 which is so arranged as to periodically supply, after each exact and constant interval of time, two pulses, one of which is a transfer pulse sent along the line 9 to the memory bank 6 and a zero reset pulse along the line 10 to the counter 4. This latter pulse is spaced by a very short time from the preceding pulse. In this manner the voltages at the outputs 7 represent in a binary coded decimal system the number of pulses received at 2 during the period of time which immediately preceded the last transfer pulse.

In the case selected as an example, that is to say, binary decimal counting and operation in the decimal system, a decoding circuit 11 of a conventional type is used, which comprises four inputs connected to the outputs 7 of the memory bank 6, and 10 outputs 12 corresponding to 10 decimal numbers. This circuit functions in such a manner that only the output 12 corresponding to the value of the decimal number coded in tee memory bank is in the 0 state; all the other outputs 12 being in state 1.

These outputs 12 are connected to inputs $E_0$, $E_1$...$E_8$, $E_9$ of a diode matrix 13 (FIG. 1) which is provided with an equal number of outputs $S_8$, $S_9$. All the vertical lines supplying these outputs are connected to a power source through biasing resistors 14 and a certain number of diodes 15 are positioned, as shown in the figure so as to connect an input and an output at all the intersections located above and to the right of a diagonal connecting the intersection $E_0S_0$ and the intersection $E_8S_9$.

If we let $k$ represent the number recorded in the memory 6 when the transfer relative to a given period is made, a single input $E_k$ is in the logical state 0, and all the other inputs are in logical state 1. In this case, it will be seen that on the horizontal line 1 corresponding to $E_k$ all the vertical lines from $S_{k+1}$ to $S_9$ are at zero potential because of the diodes 15, whereas all the outputs from $S_0$ and $S_k$ inclusive are in state 1. It will be thus seen that, if only one of the inputs is at state 0, all the outputs higher than this input are at state 0.

The apparatus also comprises reversible servomotor 16 which drives the selected mechanism, for example, the needle of a recorder, and also drives, as shown schematically on FIG. 1, a rotary selector switch 17 comprising 10 fixed contact studs 18 and a rotary double contact slide arm 19 which simultaneously contacts two consecutive contact studs, but cannot stop in between them, and which connects them in state 1, the eight other contact studs being in state 0. Reduction gearing may of course be inserted between the motor 16 and the mechanism being driven.

The two contact studs 18 are connected in order by the lines 20, each to one of the input terminals of the 10 gates 21 of a comparator 22, the second inputs of these gates being respectively connected to the outputs $S_0$...$S_9$ of the matrix 13.

Assuming always that the number of pulses received during the period of time under consideration corresponds to a number $k$, all the outputs $S_0$–$S_k$ are in state 1, while the outputs $S_{k+1}$–$S_9$ are in state 0. It will be seen on the other hand that the gates 21, the inputs to which are connected to a contact stud with which the slide 19 is not in contact, are blocked, that is to say, their outputs are in state 1. Under these conditions, it will be seen that only the two gates, the inputs of which are connected to the contact studs 18 in contact with the slide 19 are rendered operative by the switch. Three cases may then arise:

1. The two operative gates 21, may correspond to the outputs $S_k$ and $S_{k+1}$. In this case, the gate 21 of row $k$ has its two inputs in state 1, so that its output 23 is in state 0. On the contrary, the gate 21, of row $k$+1 has only one input in state 1, consequently its output is in state 1. It will be seen that finally only one of the outputs 23 is in the state 0.

2. The two operative gates are both in the zone $S_0S_k$. In this case, the two gates in question simultaneously receive two states 1 at their inputs and their outputs are consequently in state 0. There are consequently two outputs 23 in state 0.

3. The operative gates are in zone $S_{k+1}S_9$ and all receive an input in zero state so that their output remains in state 1. It follows that none of the outputs 23 is in state 0.

It will thus be seen that, in order to produce the desired function it is only necessary to use a decoder 24 which determines the number of outputs in the zero state, which number may be 0, 1 or 2. Then, this decoding circuit acts on a logic circuit 25 which so controls the servomotor 16 that if there are two outputs in the zero state, it will drive the servomotor 16 and the arm 19 in the direction indicated by the arrow 26, whereas if there is no output in the zero state, it will drive the motor 16 in the direction indicated by the arrow 27. Finally, when there is a single output in the zero state, the motor remains stationary.

It will be seen that the directions chosen are such that in, each case, the arm 19 turns until it bridges the contact studs corresponding to the outputs $S_k$ and $S_{k+1}$, that is to say, it always returns the device to its equilibrium position. Consequently, once the needle or mechanism driven by the servomotor 16 is set in this position for the value $S_k$, the needle of the recorder will always indicate the exact number of pulses arriving at 2 during the last complete counting period.

In order to increase the precision of the device the number of decades may be increased so that each value is represented by a number having several digits, for example a decimal number having two digits as illustrated on FIG. 2. In this embodiment the counter comprises two decades consisting of a units decade 4 supplied as before, through the input terminal 2, and a tens decade 4d supplied through the holding circuit 28 from the decade 4. Associated with each decade is a circuit identical to the one previously described and comprising a memory 6 or 6d the transfer pulses of which are transmitted, like the zero reset pulses of tee counters 4 or 4d, from the same time base 8. Each circuit comprises a decoder 11 or 11d, a decoding matrix 13 or 13d comprising diodes and a comparator having gates 22 or 22d. Each of these comparators is connected by connectors 20 or 20d to a rotary switch 17 and 17d, respectively, identical to the one previously described.

However, there is only one servomotor which drives, through appropriate reduction gearing if necessary, both the desired mechanism and the rotary switch 17, whereas the latter drives the rotary switch 17d indirectly through suitable reduction gearing so that the corresponding arm 19d advances one step each time the arm of the switch 17 makes a complete revolution. This servomotor 16 is still actuated by a logic circuit 25 which is supplied information by the decoder 24, which acts in response to the number of outputs 23 in the zero state in the comparators 22 and 22d, while leaving the priority to the tens comparator 22d and consequently ignoring the information supplied by the units comparator 22, except when the comparator 22d has only one gate in the 0 state.

As a consequence, the servomotor 16 drives the entire mechanism until the number of tens is correct, continues until the number of units is correct, and then stops. The recording mechanism consequently assumes an angular position which is a function of the exact number of pulses received at the terminal 2 during the last complete counting period, but in this case, this number is defined with greater precision. The number of decades may be indefinitely increased in the same manner to obtain even greater precision.

It may be easily seen that, as compared with known devices actuated by step-by-step motors, the apparatus according to the invention has the great advantage of providing an all or nothing drive with permanent position control which renders any error impossible.

It will of course be appreciated that the foregoing embodiment has been described purely by way of illustration and may be modified as to detail without thereby departing from the basic principles of the invention. In particular, a pure binary coded system which gives 16 positions for a counter using 4 bits, and 256 positions for a counter having in series two components utilizing four bits, may be used instead of the binary coded decimal system (BCD).

What I claim is:

1. Means for so controlling the angular position of a shaft that its position is dependent on the value of a number stored in a digital register equipped with a binary memory, said means comprising:

a decoder supplied by said memory, and having a separate output for each of a plurality of successive digits, a matrix comprising a plurality of input lines, one connected to each output of the decoder, and an output line for each input line, each output line being so connected through diode means to at least one input line that all output lines for digits having a value no greater than the number in said register are in one logical state, while those output lines for larger digits are in another logical state, a comparator comprising a plurality of gates, one input of each gate being connected to a different matrix output line, a rotary switch comprising a rotating contact member and a plurality of contact studs, two of which are engaged by said contact member at each operating position thereof, and each of which is connected to the other input of one of said comparator gates, a reversible servomotor connected to drive said rotating contact member, a decoder supplied by said comparator, and a logic circuit supplied by said last mentioned decoder and connected to cause actuation of said servomotor in one direction or the other, or stoppage of said servomotor in dependence on the number of comparator gates having outputs in a logical state differing from that of the majority of said comparator gates.

2. Control means as claimed in claim 1 comprising a plurality of memories, one for each of a plurality of successive orders of magnitude, and an individual decoder, matrix and comparator for each memory, each comparator being connected to supply said servomotor through a decoder and said logic circuit, with the comparator connected to the memory for numbers of the highest order of magnitude having priority.

3. In combination, a digital register comprising an input terminal connected to transmit control pulses to a digital counter, a memory supplied by and having the same number of bits as the counter, a time base connected to supply after each counting period a transfer pulse which causes the output of the counter to be set up on the outputs of the memory, and a resetting pulse which resets said counter to zero, and control means as claimed in claim 1 connected to be supplied by said memory.